W. E. JENKINS.
TRANSMISSION GEARING.
APPLICATION FILED NOV. 25, 1908.

934,731.

Patented Sept. 21, 1909.
4 SHEETS—SHEET 2.

Witnesses
Lloyd W. Patch
Walter T. Estabrook

Inventor
William E. Jenkins
By Simon E. Hodges
his Attorney

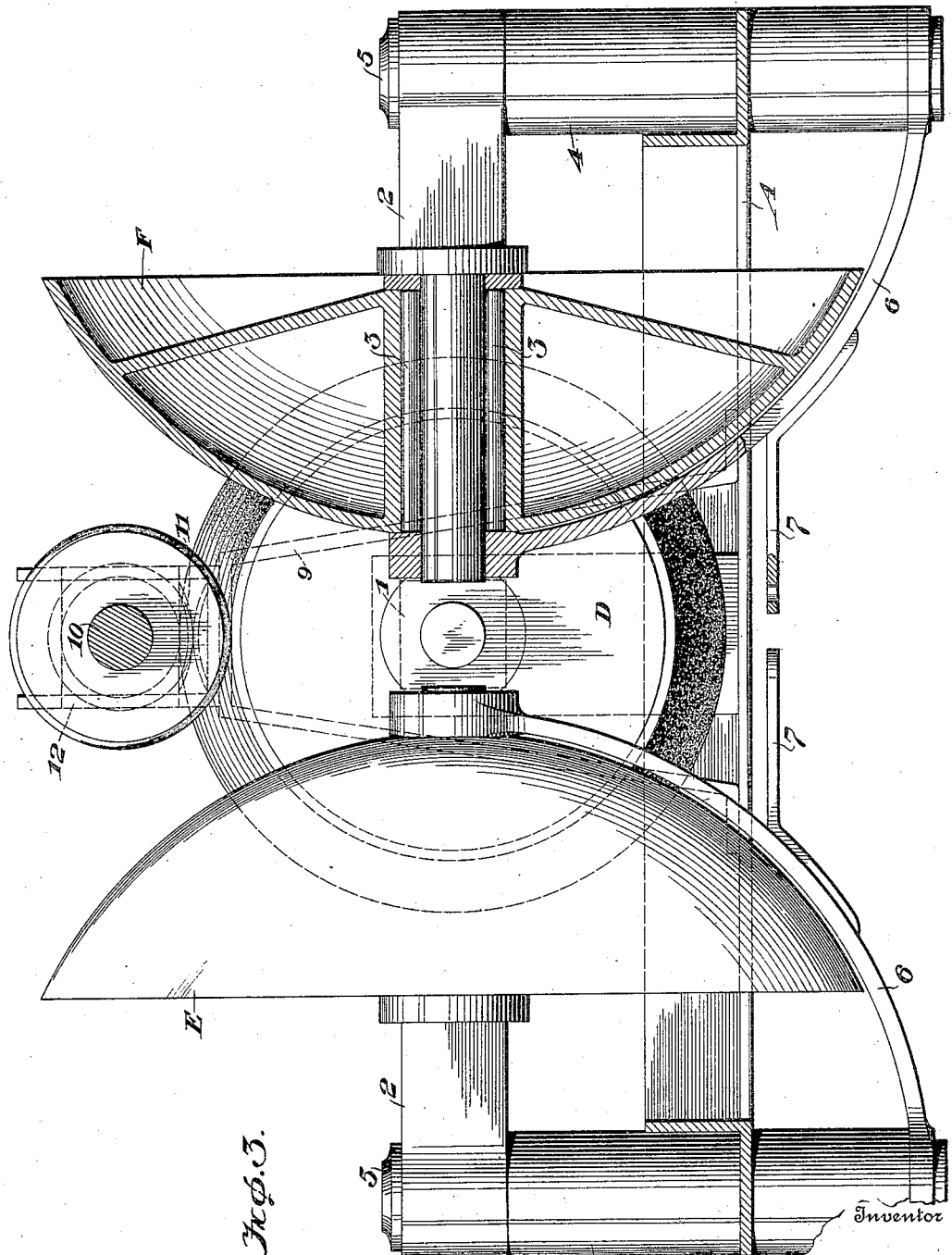

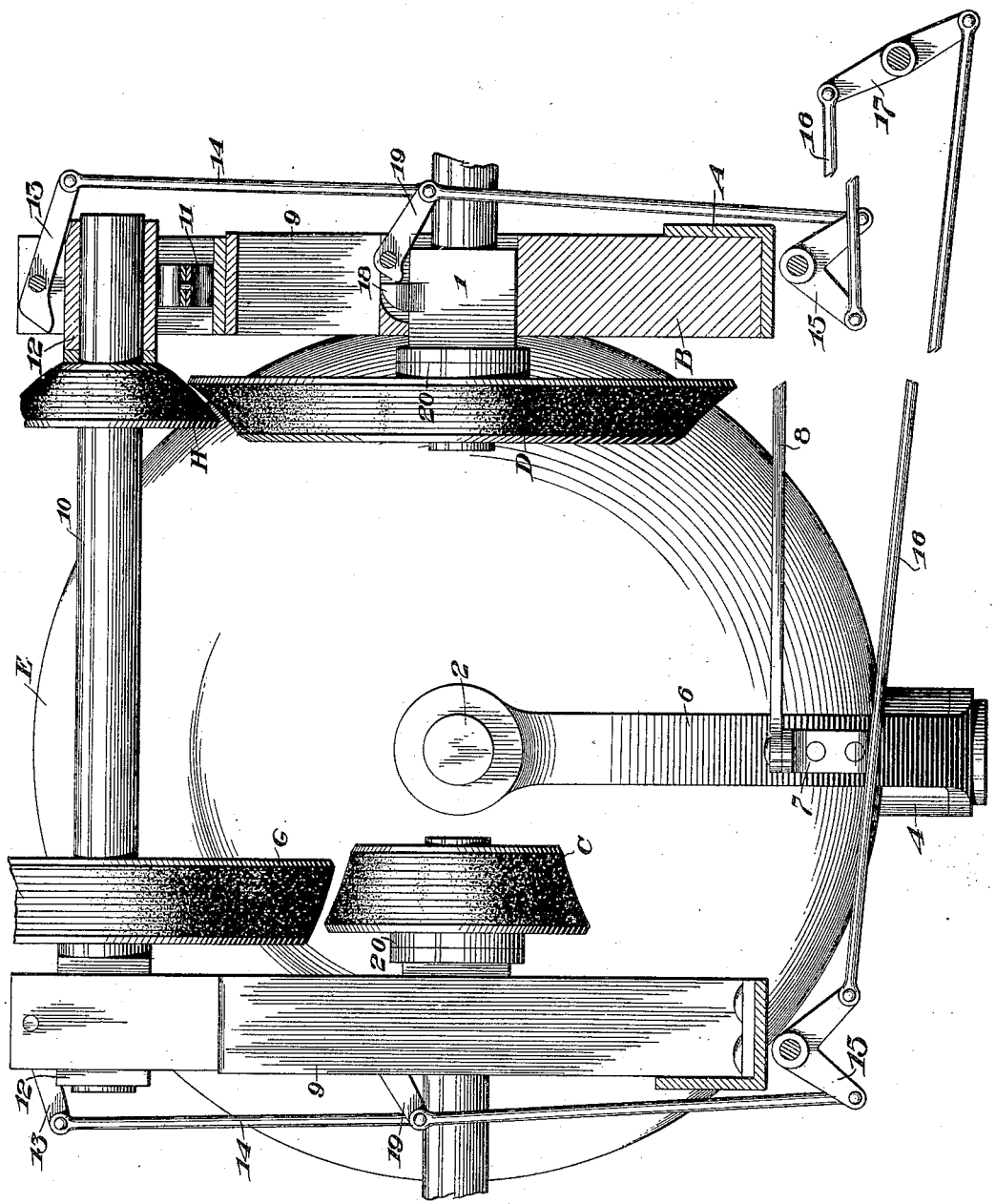

UNITED STATES PATENT OFFICE.

WILLIAM E. JENKINS, OF MILTON, PENNSYLVANIA.

TRANSMISSION-GEARING.

934,731.

Specification of Letters Patent. Patented Sept. 21, 1909.

Application filed November 25, 1908. Serial No. 464,415.

*To all whom it may concern:*

Be it known that I, WILLIAM E. JENKINS, a citizen of the United States, residing at Milton, in the county of Northumberland and State of Pennsylvania, have invented certain new and useful Improvements in Transmission-Gearing, of which the following is a specification.

My invention relates to an improvement in frictional gearing, and the object is to provide means whereby the drive and driven shafts can be operated upon and whereby either the driving shaft will rotate faster than the driven shaft or the driven shaft will rotate faster than the driving shaft.

A further object is in the provision of a reversing mechanism, which is adapted to be brought into engagement with the driven and driving shafts.

The invention consists in many novel features of construction and combinations of parts which will be hereinafter described and pointed out in the claims.

Figure 1:
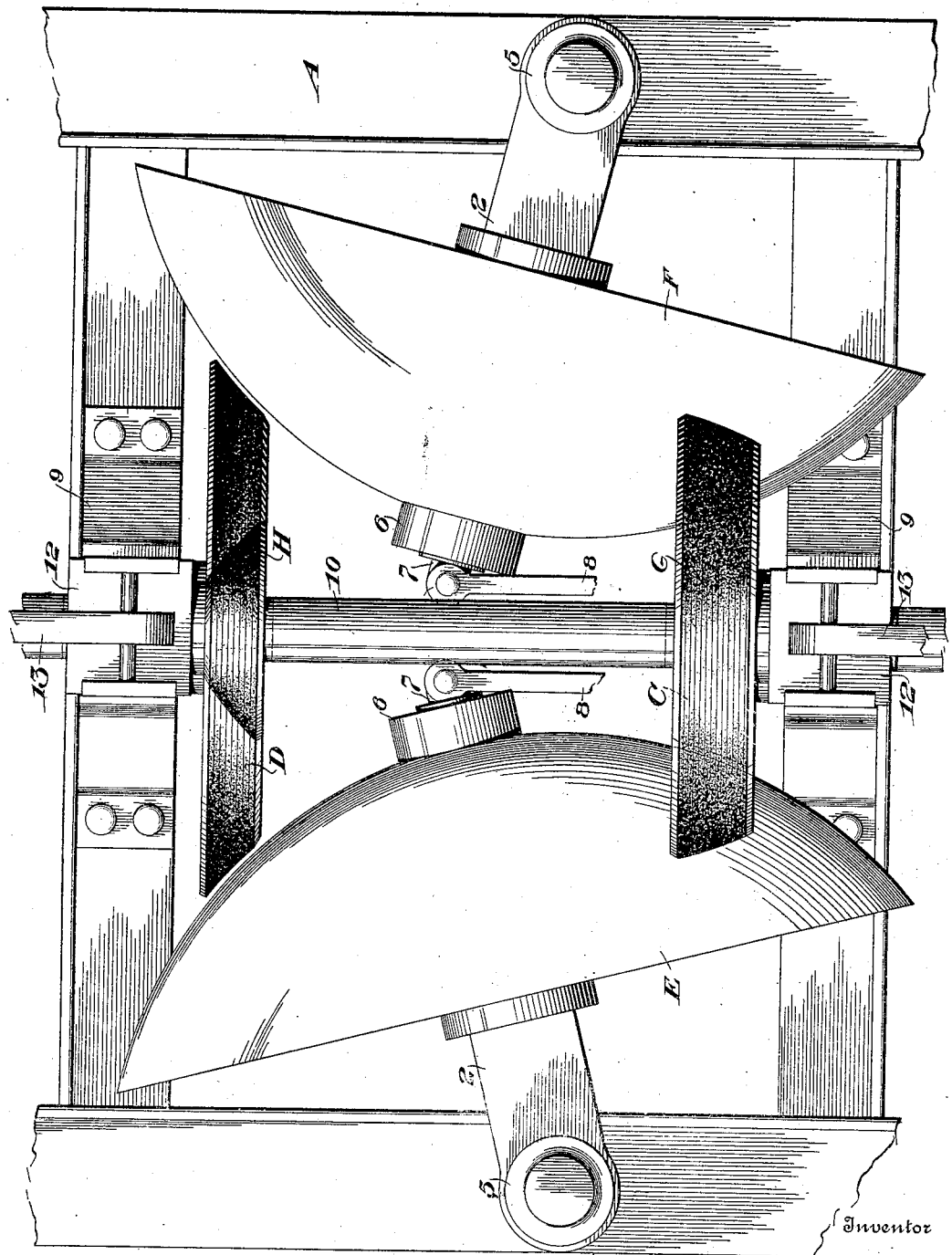
Figure 2:
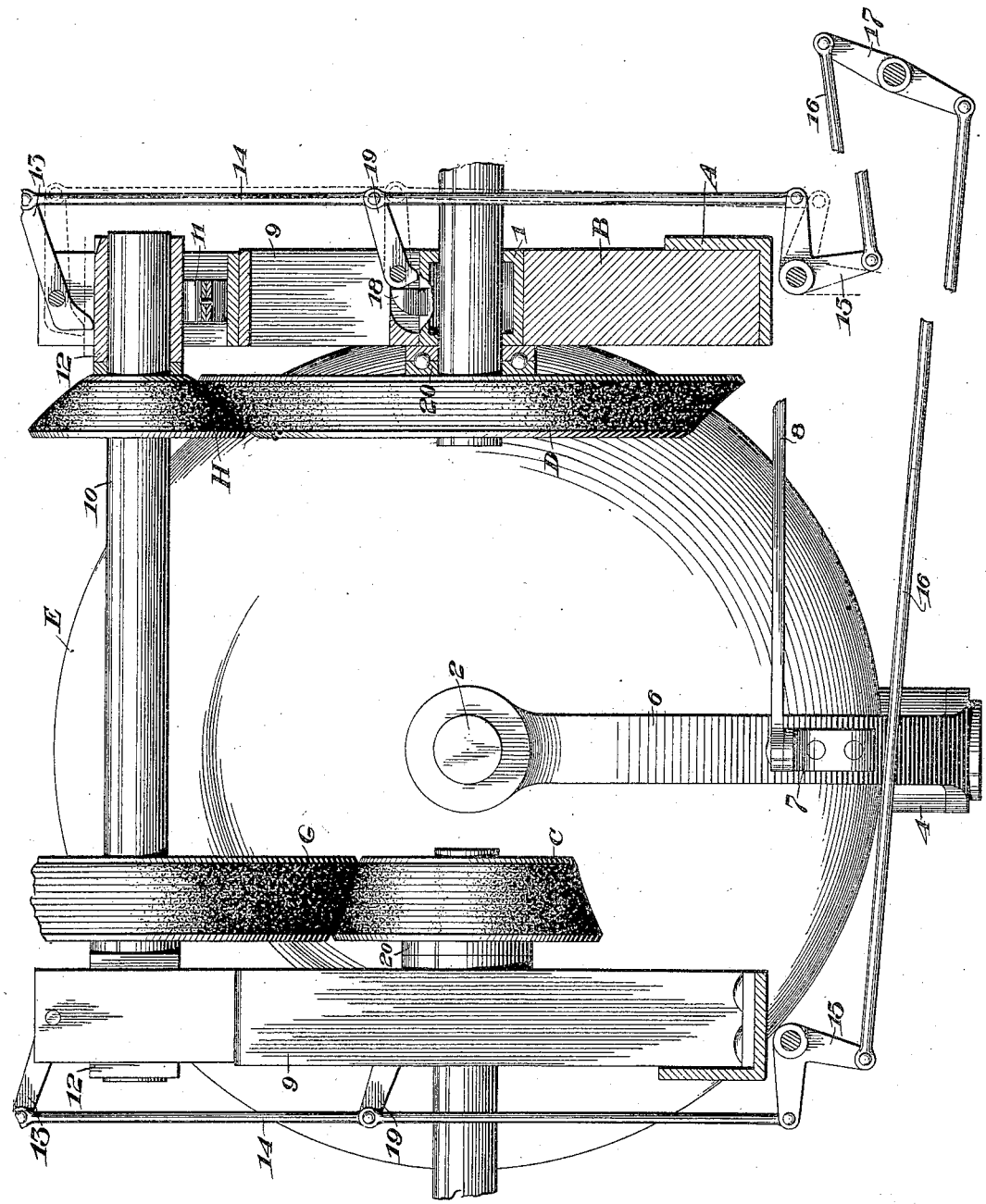

In the accompanying drawings:—Figure 1 is a top plan view; Fig. 2 is a vertical sectional view with one of the spherical disks removed; Fig. 3 is a longitudinal sectional view; and Fig. 4 is a view similar to Fig. 2, showing the drive and driven shafts in contact with the spherical disk and the reversing mechanism in its normal condition or in position when out of contact with the driving or driven shafts.

A represents a frame, and B standards mounted on the frame A. Journaled in journal boxes 1, 1 are the driving and driven wheels C and D. The driving wheel is smaller than the driven wheel, and these wheels are adapted to be thrown into engagement with spherical disks E and F. These spherical disks are mounted on shafts 2, 2, which shafts do not revolve, but the disks are provided with roller bearings 3 upon which they revolve. The shafts 2 are connected to castings 4 mounted on the frame A. Keyed to the castings 4 and passing through the frame A are pins 5. Yokes 6, 6 are connected to one end of the shaft 2 in front of the spherical disks extending down beneath the frame A, and extending through the yokes are the pins 5, thereby locking or connecting the supporting means for the spherical disks together, so that the spherical disks are oscillated upon the pins 5. Arms 7 are connected to the yokes 6, and connecting the arms are rods 8 which lead to a lever (not shown) by which the disks are oscillated for changing the speed of the vehicle. When the spherical disks are oscillated so that the driving wheel C is received at about the center of the disks a greater speed will be given the driven shaft as the wheel D is brought to the larger diameter of the spherical disks E and F in contact with the driven wheel D and the smaller diameter in contact with the driving wheel C, thereby causing the wheel C to revolve at a reduced rate of speed.

Supports 9 are connected to the frame A and mounted on the supports is a shaft 10. Mounted on the shaft are friction wheels G and H. These wheels are adapted to be brought in contact with the wheels C and D for reversing the motion of the driven wheel D. The shaft 10 is slidable in the support and is held in its normal position by springs 11, which hold the friction wheels out of contact with the driven and driving wheels D and C, the springs 11 bearing upon the supports 9 and the journal boxes 12 in which the shaft 10 is journaled.

Pivotally mounted in the support are cams 13, which are adapted to be forced against the shaft 10, causing the gear wheels G and H to be lowered and brought into contact with the wheels C and D. Connected to the cams 13 are rods 14, which rods are connected to bell cranks 15. Rods 16 are connected to the bell cranks 15, 15, and a connecting bar 17 connects the ends of the rods 16. The bar 17 is adapted to be connected with an operating lever (not shown) whereby the rods are actuated for causing the cams 13 to be brought into engagement with the shaft 10, causing the friction wheels G and H to be brought into engagement with the driving and driven wheels when it is desired to give a reverse movement to the driven wheel. When the friction wheels G and H are brought into contact with the driving and driven wheels, the driven wheel D is caused to revolve in the same direction as the wheel C.

The journal boxes 1 are adapted to slide in the standards B and lugs 18 are formed on the journal boxes, which are adapted to be engaged by cams 19 which are pivotally mounted in the standards B. These cams are brought into engagement with the lugs 18 by the rods 14, to which the cams are pivotally connected. When the operating lever is thrown ahead it causes the cams 19 to be drawn downward and the cams 13 forced out of engagement with the shaft 10, thereby permitting the reversing gears G and H to return to their normal position by the springs 11. When the cams 19 are drawn downward they come in contact with the lugs 18 forcing the journal boxes 1 against the ball thrust bearings 20 of the driving and driven wheels, and causing the wheels to be brought into engagement with the spherical disks or wheels E and F.

When the operating lever is thrown ahead or to obtain the forward motion of the vehicle the rods 14 will cause the cam 19 to come into engagement with the lugs 18 forcing the driven and driving wheels D and C into contact with the spherical wheels E and F. The same operation which brings the wheels D and C into contact with the wheels E and F releases the cams 13 from engagement with the shaft 10 permitting the friction wheels H and G to move upwardly under the tension of the springs 11 and out of engagement with the wheels D and C. By operating the rods 8 the spherical disks or wheels E and F are brought into contact with the driving and driven wheels C and D, that is, as the wheels E and F are oscillated for changing the speed of the vehicle the wheel C will receive a greater or lesser speed according to the direction of movement of the spherical disks. When the spherical disks are moved toward the driving wheel C a smaller diameter of the spherical wheels is brought in contact with the wheel C and the larger diameter in contact with the driven wheel D, thereby causing the wheel D to revolve at an increased rate of speed. When the wheels E and F are moved in the opposite direction or toward the wheel D it will bring the larger diameter in contact with the driving wheel C and the smaller diameter in contact with the driven wheel D, thereby causing the wheel D to revolve at a reduced rate of speed.

When it is desired to reverse the motion of the driven wheel D thereby reversing the movement of the car or vehicle, the operating lever is thrown rearward causing the rod 16 to operate the bell crank 15 which forces the rods 14 upwardly, causing the cams 19 to become disengaged with the lugs 18, thereby permitting the wheels C and D to slide out of contact with the spherical disks E and F. The cams 13, however, are brought into contact with the shaft 10 causing the shaft to be forced downward so that the wheels G and H are brought into contact with the driving and driven wheels C and D, causing the wheel D to revolve in the same direction as the wheel C, as the wheels H and G are both fast on the shaft 10.

It is my object to apply this frictional gearing to motor vehicles or any class of vehicles upon which a frictional gearing could be used. I have provided a simple means for obtaining different speeds and a reversing mechanism which can be brought into contact with the driving and driven wheels for reversing the motion of the driven wheel.

It is evident that more or less slight changes might be resorted to in the form and arrangement of the several parts described without departing from the spirit and scope of my invention, and hence I do not wish to be limited to the exact construction herein set forth, but:—

Having fully described my invention, what I claim as new and desire to secure by Letters Patent, is:—

1. In a transmission gearing the combination with a frame, of driving and driven wheels, spherical disks in engagement with the driving and driven wheels, a shaft mounted on the frame, friction wheels mounted on the shaft and means for moving the shaft for causing the friction wheels to be brought into contact with the driving and driven wheels for reversing the motion of the driven wheel.

2. In a transmission gearing the combination with a frame, of driving and driven wheels, spherical disks pivotally mounted on the frame, means for throwing the driving and driven wheels into contact with the spherical disks and means for operating the spherical disks for changing the speed of the driven wheel.

3. In a transmission gearing the combination with a frame, of driving and driven wheels, spherical disks mounted on the frame, friction wheels mounted on the frame and means for throwing the driving and driven wheels into contact with the spherical disks and said means adapted to release the driving and driven wheels from engagement with the spherical disks and to throw the friction wheels into engagement with the driving and driven wheels for reversing the motion of the driven wheel.

4. In a transmission gearing the combination with a frame, of driving and driven shafts slidably mounted in the frame, driving and driven wheels mounted on the driving and driven shafts, oscillating spherical disks mounted on the frame, cams in engagement with the driving and driven shafts and means for operating the cams for throwing the driving and driven wheels in contact with the spherical disks.

In testimony whereof I affix my signature, in the presence of two witnesses.

WILLIAM E. JENKINS.

Witnesses:
JOSEPH C. HARRIS,
HARRY A. HARRIS.